(12) United States Patent
Han

(10) Patent No.: US 8,579,708 B2
(45) Date of Patent: Nov. 12, 2013

(54) METHOD OF MATCHING GAME USERS, AND ELECTRONIC DEVICE USING THE SAME

(75) Inventor: Dong-hoon Han, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 12/404,526

(22) Filed: Mar. 16, 2009

(65) Prior Publication Data

US 2009/0239668 A1    Sep. 24, 2009

(30) Foreign Application Priority Data

Mar. 20, 2008    (KR) .................................. 2008-25919

(51) Int. Cl.
*A63F 9/24*    (2006.01)
*A63F 13/00*    (2006.01)
*G06F 17/00*    (2006.01)
*G06F 19/00*    (2011.01)

(52) U.S. Cl.
USPC .................................. 463/40; 463/42; 463/25

(58) Field of Classification Search
USPC ............................................. 463/25, 40, 42
See application file for complete search history.

(56) References Cited

U.S. PATENT DOCUMENTS

| | | | | |
|---|---|---|---|---|
| 6,322,451 B1* | 11/2001 | Miura | ............................. | 463/42 |
| 6,699,125 B2* | 3/2004 | Kirmse et al. | .................. | 463/42 |
| 2002/0094869 A1* | 7/2002 | Harkham | ......................... | 463/42 |
| 2002/0183117 A1* | 12/2002 | Takahashi et al. | .............. | 463/42 |
| 2003/0177187 A1* | 9/2003 | Levine et al. | .................. | 709/205 |
| 2004/0097287 A1* | 5/2004 | Postrel | ............................ | 463/41 |
| 2005/0002384 A1* | 1/2005 | Larson et al. | .................. | 370/360 |
| 2005/0070359 A1* | 3/2005 | Rodriquez et al. | .............. | 463/42 |
| 2005/0192097 A1* | 9/2005 | Farnham et al. | ................ | 463/42 |
| 2005/0227766 A1* | 10/2005 | Kaminagayoshi | .............. | 463/42 |
| 2006/0121990 A1* | 6/2006 | O'Kelley et al. | ................ | 463/42 |
| 2006/0287096 A1* | 12/2006 | O'Kelley et al. | ................ | 463/42 |
| 2007/0218997 A1* | 9/2007 | Cho | ................................ | 463/42 |
| 2008/0318687 A1* | 12/2008 | Backer et al. | ................... | 463/42 |

* cited by examiner

*Primary Examiner* — Fernando L Toledo
*Assistant Examiner* — Karen Kusumakar
(74) *Attorney, Agent, or Firm* — Jefferson IP Law, LLP

(57) ABSTRACT

A method of matching game users for a game in an electronic device, the method including: displaying a user interface screen to receive, from a user, a selection of an option for starting the game; and creating a match by searching a network and/or a subnet for one or more game participants in response to receiving a selection of an option, via the user interface screen, to match a plurality of users to play the game. Accordingly, it is possible to more rapidly create a match between a plurality of game participants.

21 Claims, 14 Drawing Sheets

FIG. 2

| 1. Single Player | 2. Multiplayer |
|---|---|
| 3. Ranking | 4. My Record<br>Finish |

FIG. 3

| 1. Network Match ||
|---|---|
| 2. Network Join ||
| 3. Network Quick Join ||
| 4. Network Quick Match ||
| 5. Subnet Match ||
| 6. Subnet Join ||
| 7. Subnet Quick Join ||
| 8. Subnet Quick Match ||
| Back | Finish |

FIG. 7

| 1. Network Match |
| 2. Network Join |
| 3. Networ... Search for game opponents has failed. Do you want to search again for game opponents? [Yes] [No] |
| 4. Networ... |
| 5. Subnet... |
| 6. Subnet Join |
| 7. Subnet Quick Join |
| 8. Subnet Quick Match |
| Back | Finish |

METHOD OF MATCHING GAME USERS, AND ELECTRONIC DEVICE USING THE SAME

CROSS-REFERENCE TO RELATED APPLICATION

This application claims the benefit of Korean Application No. 2008-25919, filed Mar. 20, 2008 in the Korean Intellectual Property Office, the disclosure of which is incorporated herein by reference.

BACKGROUND OF THE INVENTION

1. Field of the Invention

Aspects of the present invention relate to a method of matching game users and an electronic device using the method, and more particularly, to a method of matching a plurality of game users so that the plurality of game users can participate in and play a game, and an electronic device using the method.

2. Description of the Related Art

Technological developments in network communication and personal computers (PC) have enabled game users to participate in large-scale computer games at home. In particular, network games can be played by a plurality of game users online and, thus, have gained popularity. Accordingly, efforts have been made to develop various methods and devices for playing network games.

Since network games involve a plurality of game users, the game users are matched with each other. In conventional online games, a user who desires to play a network game manually generates a match room, and then waits for other users to join the network game. Alternatively, the user enters a match room generated by another user.

In more detail, if the user selects a multiplayer option from a game menu, a network server generates the match room. Subsequently, users who desire to participate in the network game join the generated match room while waiting in a network game lobby. Accordingly, if the user who generates the match room determines that there are enough game users to play the game, the user starts the game.

Technologies have been developed to allow online games (i.e., network games) to be executed using televisions, which are widely used in homes. However, game programs for televisions are relatively easy, casual games when compared to game programs for PCs. As a result, many game users prefer games for PCs. Therefore, as games for televisions are not as popular as games for PCs, it is difficult to collect game participants in order to play such games for televisions.

When it comes to network games, it is difficult to execute network games regardless of their gaming environment, whether it is PC-based gaming environment or television-based environment.

SUMMARY OF THE INVENTION

Aspects of the present invention relate to a method of matching game users by rapidly collecting game participants so that a plurality of gamers can participate in a game, and an electronic device using the method.

According to an aspect of the present invention, there is provided a method of matching game users for a game in an electronic device, the method including: displaying a user interface screen to receive, from a user, a selection of an option for the game; and creating a match by searching a network and/or a subnet for one or more game participants in response to receiving a selection of an option, via the user interface screen, to match a plurality of users to play the game.

The creating of the match may include: if a network-related option is selected on the user interface screen, transmitting a match request to a server on the network so that the server searches the network for one or more game participants; and if the one or more game participants are found as a result of the server searching, creating the match with the one or more game participants.

The network-related option may include a network quick match option to search a network for one game participant via the server, and/or a network quick join option to search a network for a plurality of game participants via the server.

The creating of the match may include: if a subnet-related option is selected on the user interface screen, transmitting one or more game participation requests to other electronic devices on the subnet; and if one or more join requests are received in response to the one or more game participation requests, creating a match with one or more game participants who have transmitted the join requests.

The subnet-related option may include a subnet quick match option to enable the electronic device to directly search the subnet for a game participant, and/or a subnet quick join option to enable the electronic device to directly search the subnet for a plurality of game participants.

The method may further include: if a match request is received via the network or the subnet during a predetermined period of time prior to the receiving of the selection of the option, via the user interface screen, creating the match with a game participant who has transmitted the match request, without the searching for the one or more game participants.

The method may further include: transmitting unique information of the electronic device to a server on the network, so that automatic login is performed, in response to a turning on of the electronic device.

The method may further include, if a plurality of identifications (IDs) are registered in the server for the unique information of the electronic device, providing a list to enable the user to select one from among the plurality of registered IDs.

The method may further include: displaying a mode setting screen to receive a setting from the user to allow or to deny receipt of a game participation request from a server on the network or another electronic device on the subnet; if the setting input by the user allows receipt of the game participation request and the game participation request is received, displaying a message requesting confirmation on whether to join a game; and joining the game by transmitting a join request in response to a receiving of the confirmation from the user.

According to another aspect of the present invention, there is provided a method of matching game users in a server, the method including: receiving a plurality of unique information respectively from a plurality of electronic devices to log on the plurality of electronic devices; if a match request is received from an electronic device logged onto the server, of the plurality of logged on electronic devices, searching for at least one game participant among the plurality of logged on electronic devices; transmitting at least one game participation request to the at least one game participant found as a result of the searching; and if at least one join request is received in response to the at least one game participation request, creating a match between the at least one game participant that has transmitted the join request and a user of the electronic device that has transmitted the match request.

The searching for the at least one game participant may include searching for at least one game participant satisfying predetermined conditions based on a network speed, a game ranking, and/or a total number of matches played from among the plurality of logged on electronic devices.

The transmitting of the at least one game participation request may include: broadcasting the at least one game participation request to a predetermined number of game participants among the at least one game participant found as a result of the searching; and if no join request is received in response to the at least one game participation request within a predetermined period of time, repeatedly performing the broadcasting of the at least one game participation request to other game participants until the join request is received.

The method may further include, if one or more match requests are received from a plurality of electronic devices within a predetermined period of time, creating the match between the plurality of electronic devices without performing the searching for the at least one game participant.

The method may further include, if one or more match requests are received from a plurality of electronic devices, creating the match between a room master that generates a match room in which a match has not yet been created among match rooms that have been generated, and users of the plurality of electronic devices that have transmitted the one or more match requests.

According to still another aspect of the present invention, there is provided an electronic device to play a game and to match game users for the game, the electronic device including: an interface unit to relay communication between the electronic device and a server on a network or other electronic devices on a subnet; a user interface (UI) processing unit to generate a user interface screen to receive, from a user, a selection of of an option for the game; and a control unit to search the network or the subnet for one or more game participants via the interface unit, in response to the UI processing unit receive, via the user interface screen, a selection of an option to match a plurality of users to play the game.

If a network-related option is selected on the user interface screen, the control unit may transmit a match request to the server via the interface unit, so that the server searches the network for one or more game participants; and may be created with the one or more game participants found as a result of the server search.

The network-related option may include a network quick match option to search a network for one game participant via the server, and/or a network quick join option to search a network for a plurality of game participants via the server.

If a subnet-related option is selected on the user interface screen, the control unit may transmit, via the interface unit, one or more game participation requests to the other electronic devices on the subnet, and the control unit may create a match with one or more game participants that respectively transmit one or more join requests in response to the one or more game participation requests.

The subnet-related option may include a subnet quick match option to enable the electronic device to directly search the subnet for one game participant, and/or a subnet quick join option to enable the electronic device to directly search the subnet for a plurality of game participants.

If a match request is received via the network or the subnet during a predetermined period of time prior to the receiving of the selection of the option, via the user interface screen, the control unit may create a match with a game participant that has transmitted the match request, without searching the network or the subnet for one or more game participants.

The control unit may transmit, via the interface unit, unique information of the electronic device to the server on the network, so that automatic login may be performed, in response to a turning on of the electronic device.

If a plurality of identifications (IDs) are registered in the server for the unique information of the electronic device, the UI processing unit may display a list to enable the user to select one from among the plurality of registered IDs.

The UI processing unit may display a mode setting screen to receive a setting from the user to allow or to deny receipt of a game participation request from the server on the network or another electronic device on the subnet; the UI processing unit may display a message requesting confirmation on whether to join a game if the setting received from the user allows receipt of the game participation request and the game participation request is received; and if the confirmation is received from the user, the control unit may transmit a join request to the server on the network or the other electronic device that transmitted the game participation request.

According to yet another aspect of the present invention, there is provided a server to match game users on a network, the server including: an interface unit to relay communication between the server and a plurality of electronic devices on the network; and a control unit to create a match between the plurality of electronic devices, wherein if the interface unit receives a match request from an electronic device, of the plurality of electronic devices: the control unit searches for at least one game participant, different from the electronic device transmitting the match request, from among the plurality of electronic devices, the interface unit transmits at least one game participation request to the at least one game participant found as a result of the searching, and if the interface unit receives at least one join request in response to the at least one game participation request, the control unit creates the match between the at least one game participant who has transmitted the join request and a user of the electronic device that has transmitted the match request.

According to another aspect of the present invention, there is provided a system to match game users on a network, the system including: a first electronic device to transmit a match request in response to a user input; a second electronic device to transmit a join request in response to a game participation request; a server to match the first electronic device with the second electronic device to create a match therebetween, the server including: an interface unit to receive the match request from the first electronic device and the join request from the second electronic device; and a control unit to search for the second electronic device in response to the received match request, to transmit the game participation request to the second electronic device, found as a result of the search, and to create the match in response to the received join request.

According to still another aspect of the present invention, there is provided a system to match game users on a subnet, the system including: a first electronic device on the subnet to directly broadcast a game participation request on the subnet in response to a user input; a second electronic device on the subnet to transmit a join request to the first electronic device in response to the game participation request, wherein the first electronic device includes a control unit to create the match in response to the received join request.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2 and 3 illustrate a main user interface screen and a sub-user interface screen, respectively, through which a user is able to select options to start a game using the method of matching game users according to an embodiment of the present invention;

FIGS. 5 to 7 illustrate messages to be displayed according to the method of FIG. 1 according to an embodiment of the present invention;

DETAILED DESCRIPTION OF THE EMBODIMENTS

Figure 1:
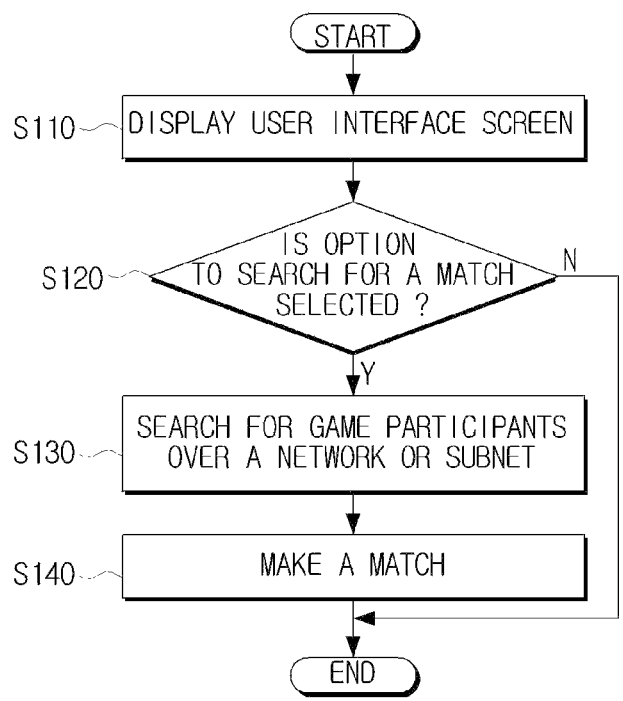
FIG. 1 is a flowchart explaining a method of matching game users in an electronic device according to an embodiment of the present invention.

Reference will now be made in detail to the present embodiments of the present invention, examples of which are illustrated in the accompanying drawings, wherein like reference numerals refer to like elements throughout. The embodiments are described below in order to explain aspects of the present invention by referring to the figures.

FIG. 1 is a flowchart explaining a method of matching game users in an electronic device according to an embodiment of the present invention. The electronic device may be implemented as a television (TV), a personal computer (PC), a set-top box (STB), or a storage medium player.

Referring to FIG. 1, a user interface screen, through which a user is able to select options to play a game, is displayed on a display in operation S110. For example, if a user selects a menu button that is included on a remote controller or on a main body of the electronic device, a main user interface screen including a main menu is displayed. In this situation, if the user enters a game menu (for example, by navigating through the menu using directional buttons and/or number buttons on the remote controller or on the main body), a sub-user interface screen indicating a sub-menu to set game play options may be displayed.

If a user selects an option to search for a match from the sub-user interface screen in operation S120, the electronic device searches for game participants over a network or subnet in operation S130, and thereby launches a game that involves two or more game participants. The subnet may be implemented by connecting two home televisions via a hub.

Such a search operation (operation S130) may be performed by transmitting game participation requests to other electronic devices that are connected to the user's electronic device via the network or subnet. If an opponent sends a join request in response to the game participation request, the search operation (operation S130) is completed. If electronic devices are connected via the network, a server to match game users may perform the search operation (operation S130). Alternatively, if the subnet is used, the electronic device may perform the search operation (operation S130). Detailed description of the above situations will be provided later.

The sub-menu to set the game play options may include, for example, network quick join, network quick match, subnet quick join, subnet quick match options, etc. Specifically, if a user selects a network-related option (such as a network quick join option or a network quick match option), the server connected via the network may search for game participants on the network. Alternatively, if the user selects a subnet-related option (such as a subnet quick join option or a subnet quick match option), the electronic device may search for game participants on the subnet itself. Here, a single apartment, a single building, or a single office may be connected via a single subnet.

A join option (such as a network quick join option or a subnet quick join option) is used to request one or more game participants. If the join option is selected, a process of searching for game participants may be performed by creating a match room, registering the match room on a game lobby, displaying whether game participants participate in a game, and/or querying users of various electronic devices connected via the network or subnet about whether they desire to participate in the game. Accordingly, game participants may be collected by the search operation (operation S130) or game participants may spontaneously participate in the game after entering the game lobby, so that it is possible to collect game participants more rapidly using the above two methods.

A match option (such as a network quick match option or a subnet quick match option) is used to request a head-to-head match. If the match option is selected, a process of searching for game participants may be performed by generating a match room, but not displaying the generated match room on a game lobby.

If game participants are found as a result of the search (operation S130), a match is made between the found game participants in operation S140. In more detail, if the game participants found as a result of the search (operation S130) accept the match (for example, by transmitting join requests or entering the game lobby and match room), all the game play options may be set up. In this situation, a room master may start the game by selecting an option labeled "Start." However, it is understood that aspects of the present invention are not limited thereto. For example, according to other aspects, if a predetermined period of time has elapsed, the game may start automatically.

FIGS. 2 and 3 illustrate a main user interface screen and a sub-user interface screen, respectively, used in a method of matching game users according to an embodiment of the present invention. FIG. 2 shows the main user interface screen displayed when a game menu is selected. The top menu displayed by the main user interface screen includes a single player option to start a single player game, and a multiplayer option to initiate a multiplayer game with at least two game participants.

If the multiplayer option is selected from the top menu, the sub-user interface screen including the sub-menu to start a game, shown in FIG. 3, may be displayed. The sub-menu includes a network match option, a network join option, a network quick join option, a network quick match option, a subnet match option, a subnet join option, a subnet quick join option, and a subnet quick match option.

The network match option is used to create a match room in a game lobby and wait for a match to be found without the need to search for game participants. The network join option is selected by a user to enter another match room created in the game lobby. The subnet match option and subnet join option are used to wait for a match to be found or to allow spontaneous participation in a game without the need to search for game participants on the subnet.

It is understood that aspects of the present invention are not limited to the abovementioned sub-menu options. That is, according to other aspects, other options of the sub-menu may be used to rapidly find a match by searching for game participants using the server on the network or using electronic devices on the subnet, to ask the game participants found as a result of the search whether they desire to participate in a game, and/or to induce the game participants to participate in the game.

Figure 4:
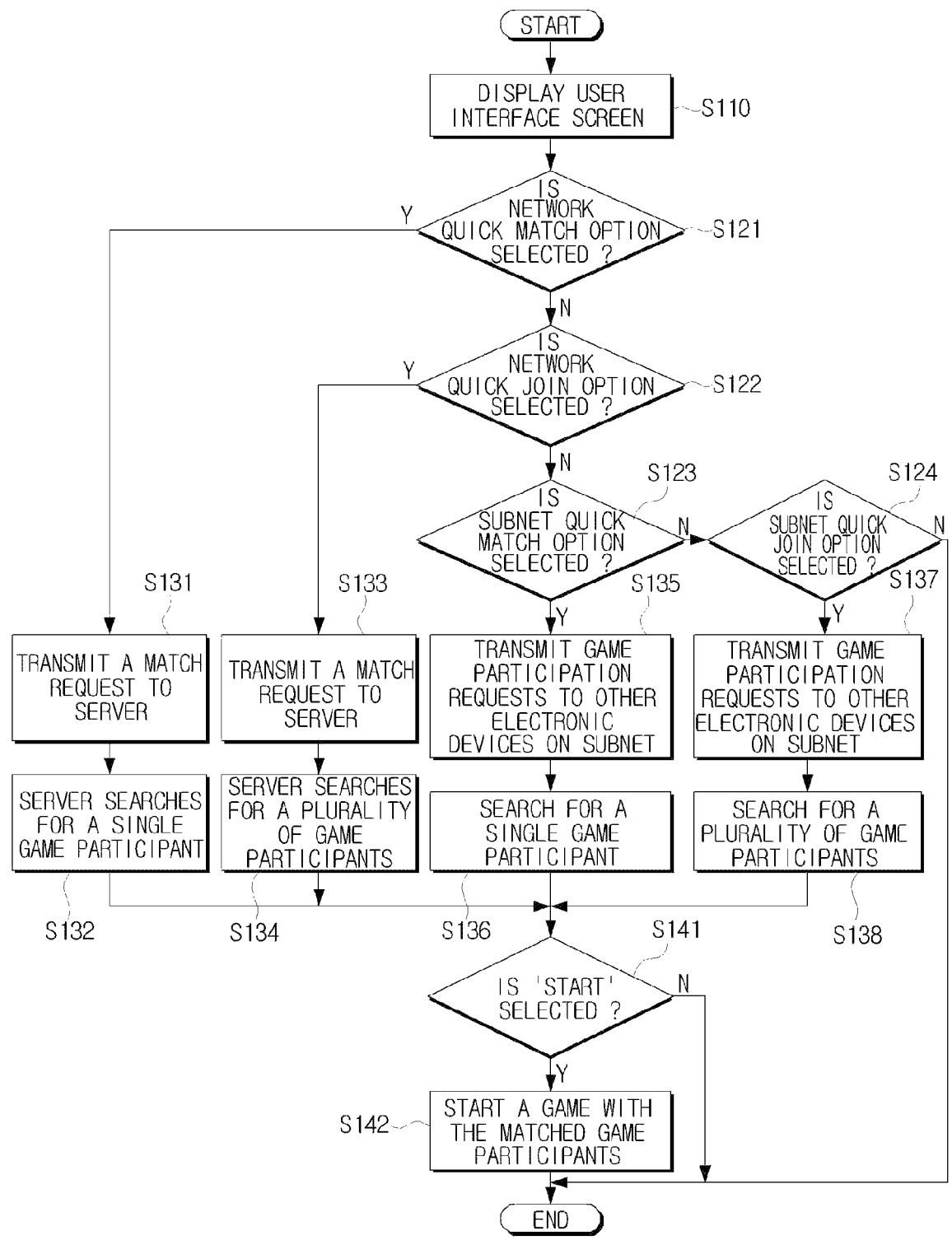
FIG. 4 is a flowchart explaining in detail the method of matching game users of FIG. 1.

FIG. 4 is a flowchart explaining in detail the method of matching game users of FIG. 1. Referring to FIG. 4, the user interface screen is displayed in operation S110. If the user selects the network quick match option in operation S121-Y, the electronic device transmits a match request to the server on the network in operation S131.

In response to the match request (operation S131), the server searches the network for one game participant among a plurality of game participants (for example, users of other electronic devices logged onto the server) when the match room is generated, but not displayed, in operation S132. In more detail, the server transmits game participation requests to other electronic devices for each group consisting of a predetermined number of electronic devices. If there is no response to the game participation requests, the server continues to transmit game participation requests to the next group consisting of a predetermined number of electronic devices until receiving a response to the requests. For example, if a total of 100 electronic devices are logged onto the server and the electronic devices are divided into five groups, each of which has 20 electronic devices, game participation requests may be transmitted to each group. In this situation, various criteria and conditions may be applied to transmit game participation requests. For example, game participation requests may be transmitted randomly, or may be transmitted by giving a highest priority to a most frequently used electronic devices based on a total number of matches. Alternatively, the highest priority may be given to electronic devices used by users closest in ranking to the game requester, or to electronic devices having higher network speeds. Accordingly, the server may pre-store information regarding ranking of electronic devices, information regarding the priority order, and/or other information.

If several people respond to the game participation requests, a match may be made with a user who responds to the request first among the several people. However, it is understood that aspects of the present invention are not limited thereto, and the match may be made with a user who has a closest ranking to the game requester, a higher network speed, etc. The game requester may select 'Start', or a game may be started automatically after a predetermined period of time has elapsed in operations S141 and S142.

If the network quick join option is selected in operation S122-Y, the server searches the network for game participants in a similar manner as the network quick match option. In more detail, if the match request is transmitted to the server in operation S133, the server generates and displays a match room in the game lobby, transmits game participation requests to each group consisting of a predetermined number of electronic devices, and searches for a plurality of game participants in operation S134. Accordingly, not only the game participants found as a result of the search but also other users waiting for a match in the game lobby may spontaneously participate in a game. As a result, if respective game participants requested by the game requester respond to the game participation requests, the game may be started in operations S141 and S142.

If the subnet quick match option is selected in operation S123-Y, an electronic device used by a user who requests a game play directly transmits game participation requests to other electronic devices on the subnet in operation S135. In other words, the electronic device used by the user acts as a server. Accordingly, if several game participants respond to the game participation requests using the subnet, the electronic device searches for one game participant among the several game participants in operation S136 so that the game may be started in operations S141 and S142.

Additionally, if the subnet quick join option is selected in operation S124-Y, the electronic device transmits game participation requests directly to the other electronic devices on the subnet in operation S137 in the same manner as operation S135, and then searches for a plurality of game participants in operation S138. When the search operation has finished, the game may be started in operations S141 and S142.

While the method of matching game users using the options displayed on the sub-user interface screen of FIG. 3 has been described with reference to FIG. 4, other various options may be added to the sub-user interface screen, or some of the options may be deleted from the sub-user interface screen according to other aspects of the present invention. Furthermore, the order of operations shown in FIG. 4 may be changed.

Figures 5, 6:
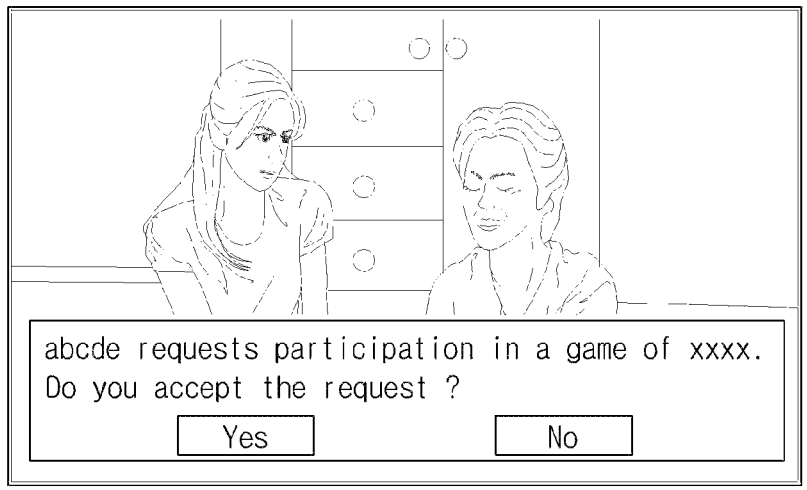

FIGS. 5 to 7 illustrate messages to be displayed in the method of FIG. 1 according to an embodiment of the present invention. That is, messages shown in FIGS. 5 and 6 may be displayed on electronic devices used by the game participants found as a result of the search. In FIG. 5, the game participants may receive a request for game participation from the game requester while using their respective electronic devices for other purposes. For example, if the electronic device is a TV, a user may receive a message asking whether to participate in a game while viewing a TV broadcast program. If the user selects "Yes" in response to the message, a game program in which the user can participate may be started.

A message such as the message shown in FIG. 6 may be displayed when another user receives a game participation request while in a game lobby after selecting a game menu on his or her electronic device.

A message such as the message shown in FIG. 7 may be displayed when a search for game participants has failed. For example, even if 100 electronic devices log onto a server or are connected via a subnet and game participation requests are transmitted five times to each group including 20 electronic devices, it is possible that no game participants may be found. In this situation, a message asking whether to search again for game participants may be displayed. Accordingly, if a game requester selects "Yes" in response to the message, game participation requests may be transmitted again to the first group consisting of 20 electronic devices among the 100 electronic devices. The messages shown in FIGS. 5 to 7 may be superimposed on video or graphic images displayed on the display of the electronic device.

Figure 8:
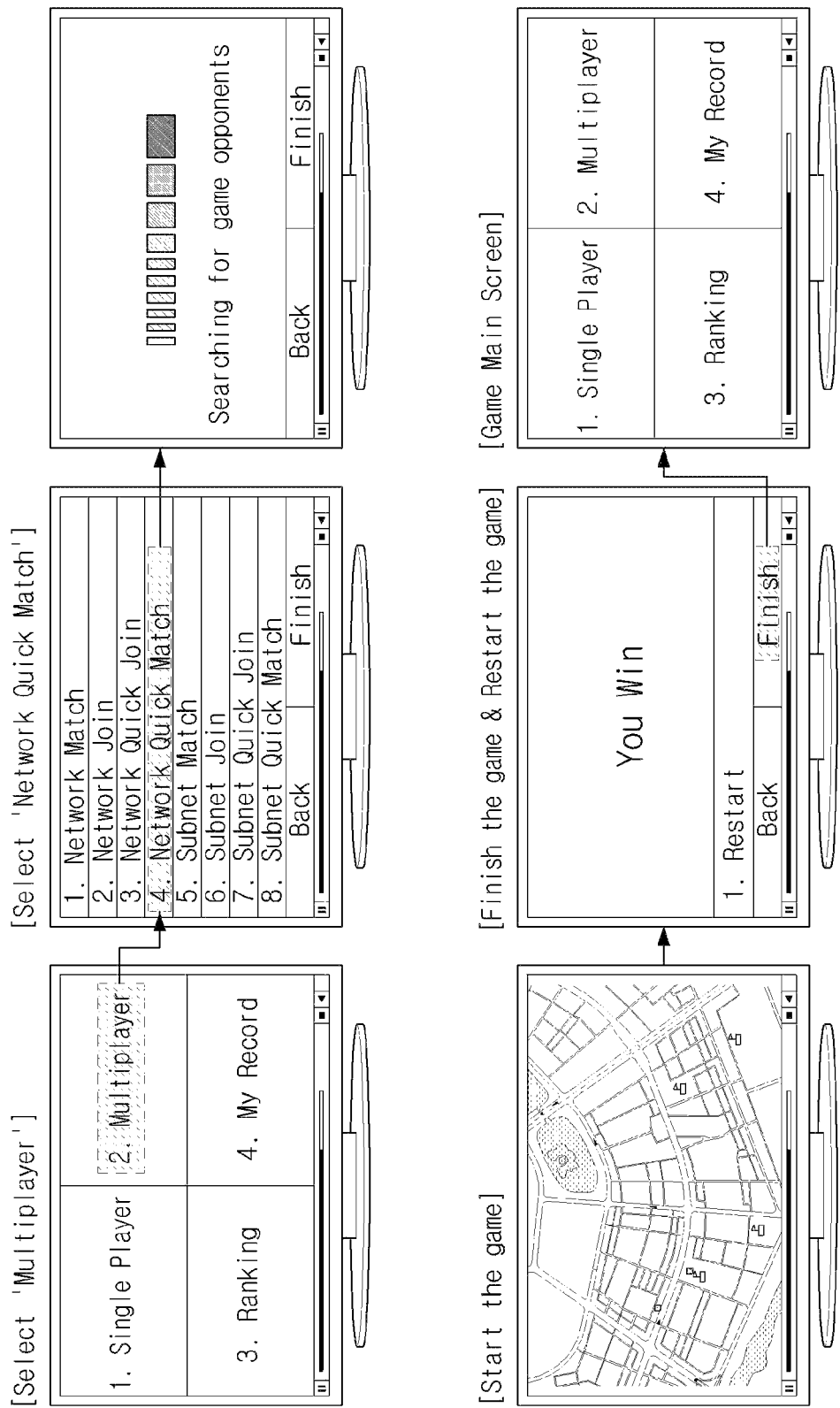
FIG. 8 illustrates a change in a screen displayed when a network quick match option is selected according to an embodiment of the present invention.

FIG. 8 illustrates a change in a screen displayed when the network quick match option is selected according to an embodiment of the present invention. Referring to FIG. 8, if the multiplayer option is selected from the main user interface screen and the network quick match option is selected from the sub-user interface screen, the server searches for game participants. As described above, the network quick match option is used to request a head-to-head match, such that a message stating that game participants are being searching for is displayed (i.e., the match room is not displayed). Accordingly, if game participants are found as a result of the search, a match may be made with the game participants and the game may be started. When the game has finished, the main user interface screen may be displayed again.

Figure 9:
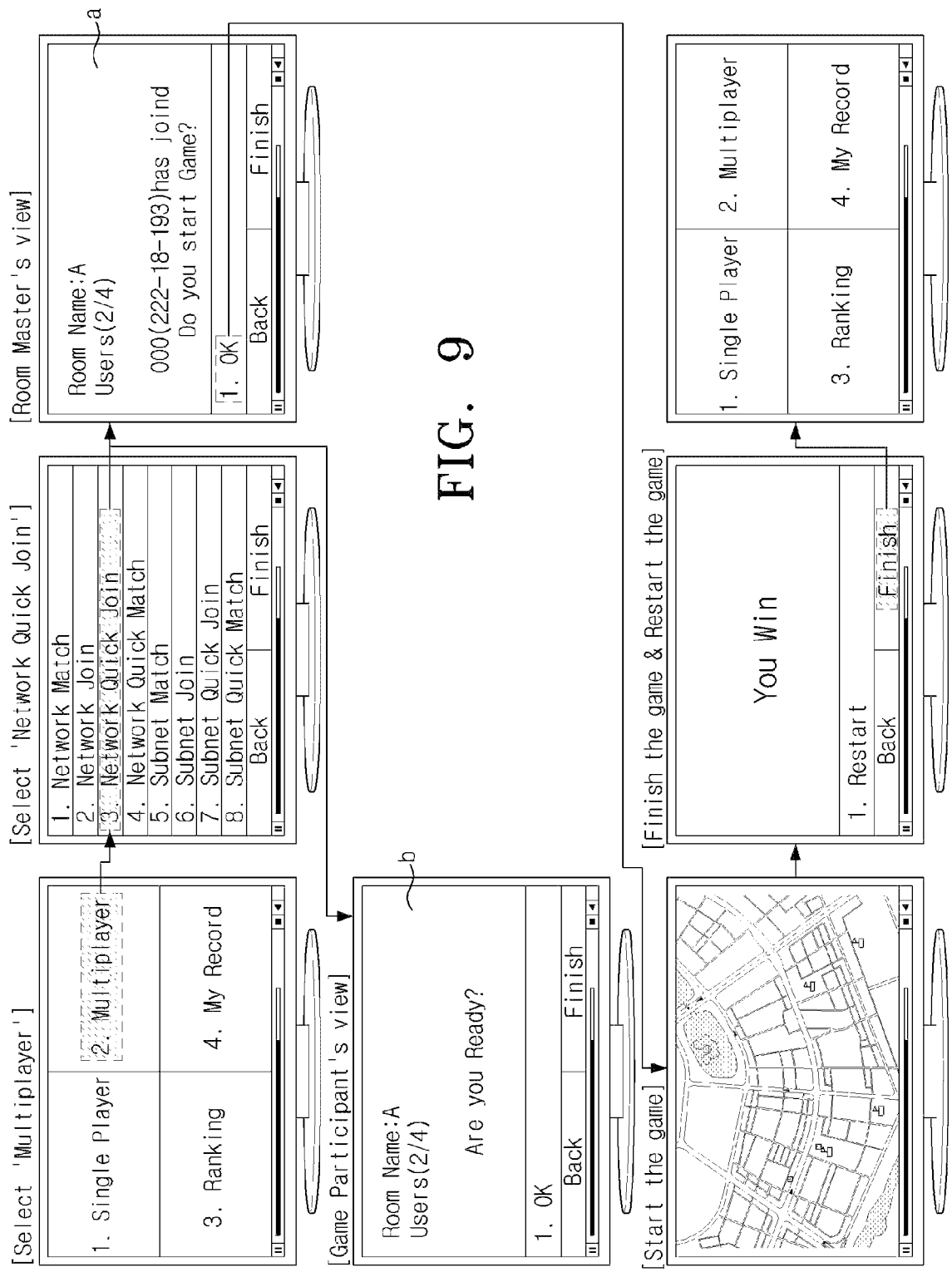
FIG. 9 illustrates a change in a screen displayed when a network quick join option is selected according to an embodiment of the present invention.

FIG. 9 illustrates a change in a screen displayed when the network quick join option is selected according to an embodiment of the present invention. Referring to FIG. 9, if the multiplayer option is selected from the main user interface screen and the network quick join option is selected from the sub-user interface screen, the server generates match room A and searches for game participants. In this situation, an electronic device of a game requester (for example, a room master) displays user interface screen a, which shows information regarding the number of game participants in match room A, a message asking whether to start a game, and an option labeled "OK" to start the game. Additionally, an electronic device of a user responding to the game participation request displays user interface screen b, which shows information regarding the number of game participants in match room A and a message asking whether the user is ready to start the game. Accordingly, if the room master selects "OK" after determining that there are enough game participants to play the game, or if a predetermined period of time has elapsed, the game may be started. When the game has finished, the main user interface screen may be displayed again.

Screens to be displayed when the subnet quick match option or the subnet quick join option are selected may change in a similar manner as the screens shown in FIGS. 8 and 9, so detailed descriptions and illustrations thereof are omitted.

Figure 10:
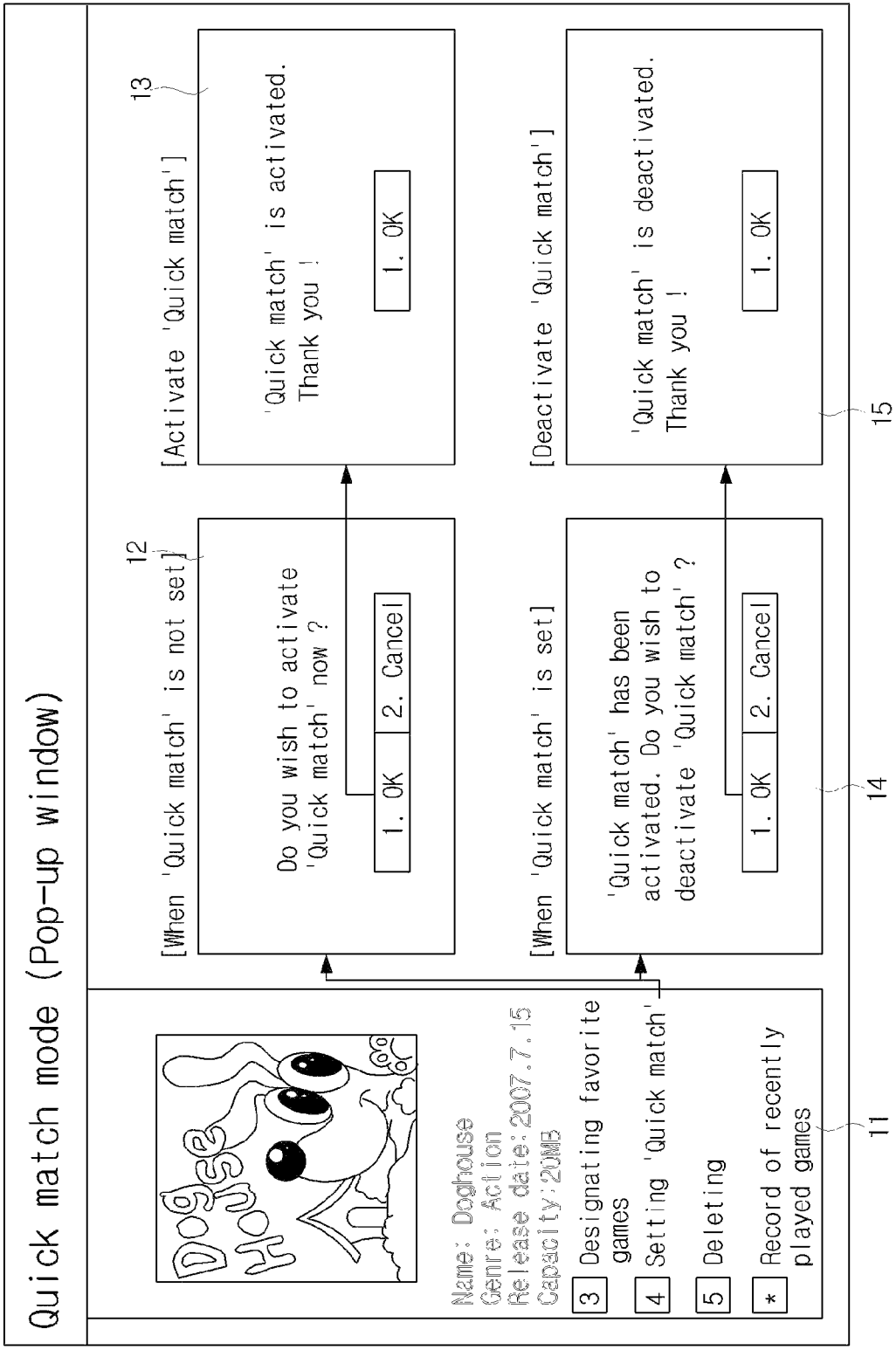
FIG. 10 illustrates a pop-up window to set a quick match mode according to an embodiment of the present invention.

FIG. 10 illustrates a pop-up window to set to a quick match mode according to an embodiment of the present invention. Referring to FIG. 10, if a user selects a quick match option from a mode setting screen 11 to set options for a specific game, an interface window 12 asking whether to set the game to the quick match mode or an interface window 14 inquiring whether to delete the quick match option may be displayed. If the user determines to set or delete the quick match option using the interface windows 12 and 14, confirmation message windows 13 and 15 may be displayed.

When the quick match mode is set through the mode setting screen 11 shown in FIG. 10, if another user requests a match (i.e., transmits a game participation request), the messages shown in FIGS. 5 and 6 may be displayed. Subsequently, if the user selects "Yes" in response to the messages shown in FIGS. 5 and 6, a join request may be transmitted to the server or to other electronic devices.

Additionally, the sub-menu of FIG. 3 may be provided only when the quick match mode is set through the mode setting screen 11 shown in FIG. 10. Alternatively, if the quick match mode is not set, the network quick join, network quick match, subnet quick join, and subnet quick match options may be deactivated or may be deleted from the sub-menu of FIG. 3.

Figure 11:
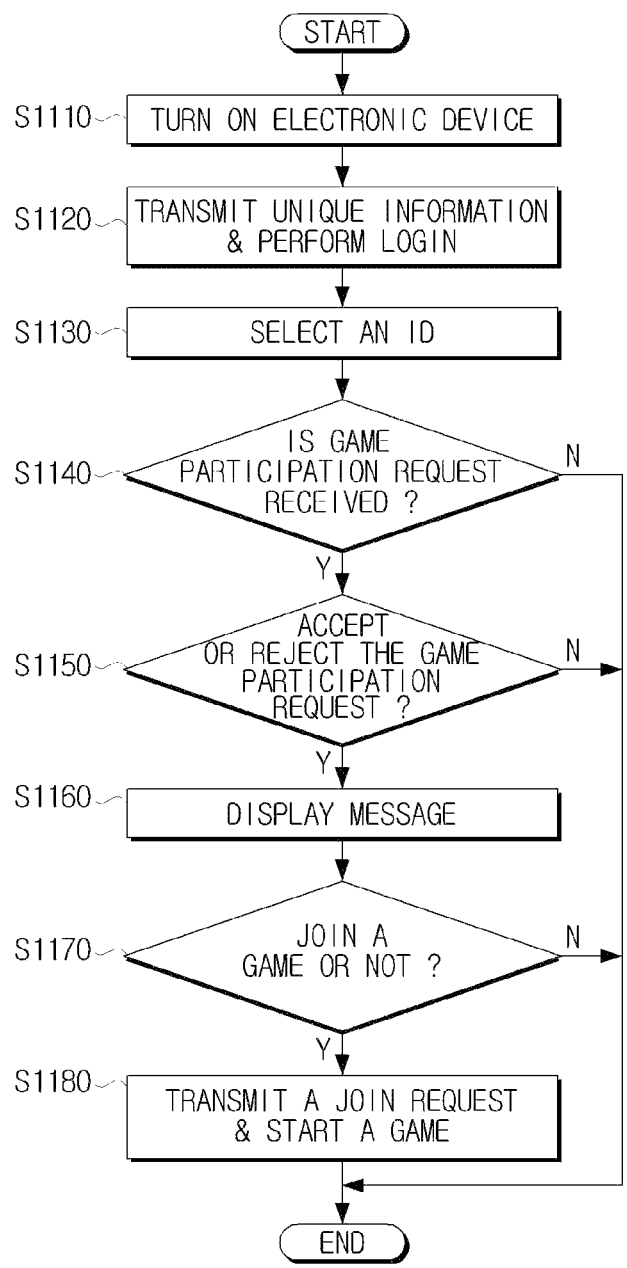
FIG. 11 is a flowchart explaining a method of processing a game participation request in an electronic device according to an embodiment of the present invention.

FIG. 11 is a flowchart explaining a method of processing a game participation request in an electronic device according to an embodiment of the present invention. Referring to FIG. 11, when the electronic device is turned on in operation S1110, the electronic device transmits its own unique information to the server on the network during an initial process so that automatic login may be performed in operation S1120. Here, the unique information is information identifying the electronic device (for example, a unique device number (UDN) provided by a certain manufacturer, such as a product serial number). If the user registers as a member of a specific Internet site in advance, the server may receive user authorization from the site using the received unique information, and automatic login may thus be performed. Accordingly, when the user turns on the electronic device, the user may be automatically logged into the server without the need to additionally execute the game program. Therefore, the number of targets to which game participation requests are transmitted can easily increase, and it is possible to collect game participants rapidly.

After automatic login, the user selects his or her identification (ID) in operation S1130. In more detail, if a plurality of users join the Internet site using a single UDN, a screen may be displayed through which they may select their own IDs or handles. Accordingly, game play history or ranking of each user can be managed separately for each user due to differences in each user's game play history or ranking. For example, if the electronic device is a TV, and if a home includes a single TV, IDs for each member of the family may be registered separately on a certain Internet site. Accordingly, even when login is performed automatically using a default ID, the members of the family may change the default ID to their own IDs and start the game.

Subsequently, if a game participation request is received from another user in operation S1140-Y, and the user of the electronic device rejects the request in operation S1150-N, no message is displayed. Alternatively, if the user accepts the request in operation S1150-Y, a message notifying that the game participation request has been accepted is displayed in operation S1160. For example, the messages shown in FIGS. 5 and 6 may be displayed.

If the user decides to join a game on viewing the displayed message in operation S1170-Y, the electronic device transmits a join request to the server or another electronic device and allows a match to be made so that the game may be started in operation S1180. Alternatively, if the user decides not to join the game on viewing the displayed message in operation S1170-N, the electronic device deletes the displayed message. In this situation, a message may be additionally displayed to the user to ask whether to change to a mode to automatically reject receipt of game participation requests.

Figure 12:
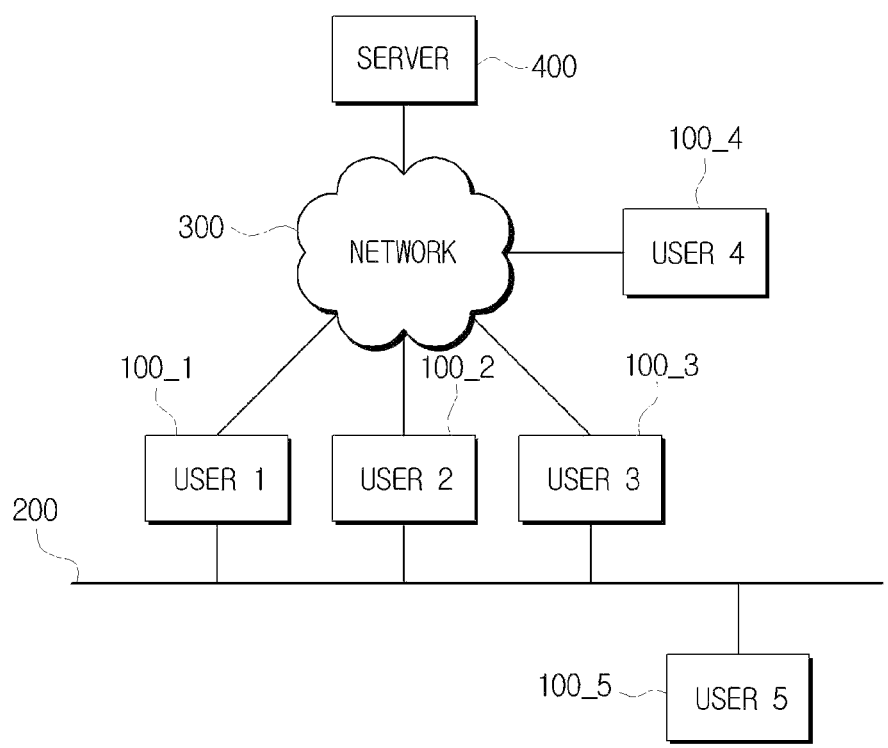
FIG. 12 is a diagram showing a system configuration according to an embodiment of the present invention.

FIG. 12 illustrates a system configuration according to an embodiment of the present invention. Referring to FIG. 12, a plurality of electronic devices 100_1 to 100_5 may be connected via a subnet 200 and/or a network 300.

If either a network quick join option or a network quick match option is selected on the electronic device 100_1 among the plurality of electronic devices 100_1 to 100_5, the electronic device 100_1 requests a server 400 to transmit game participation requests to the electronic devices 100_2, 100_3 and 100_4 connected to the server 400 via the network 300. The server 400 searches for appropriate game participants according to various criteria. For example, the server 400 may transmit game participation requests to electronic devices having higher network speeds, to electronic devices used by users closest in ranking to the game requester, or to electronic devices that play a large number of games.

If either a subnet quick join option or subnet quick match option is selected on the electronic device 100_1, the electronic device 100_1 operates as a server to directly transmit game participation requests to the electronic devices 100_2, 100_3 and 100_5 connected via the subnet 200. If enough join requests are received from game participants to play the game, a match is made with them.

Figure 13:
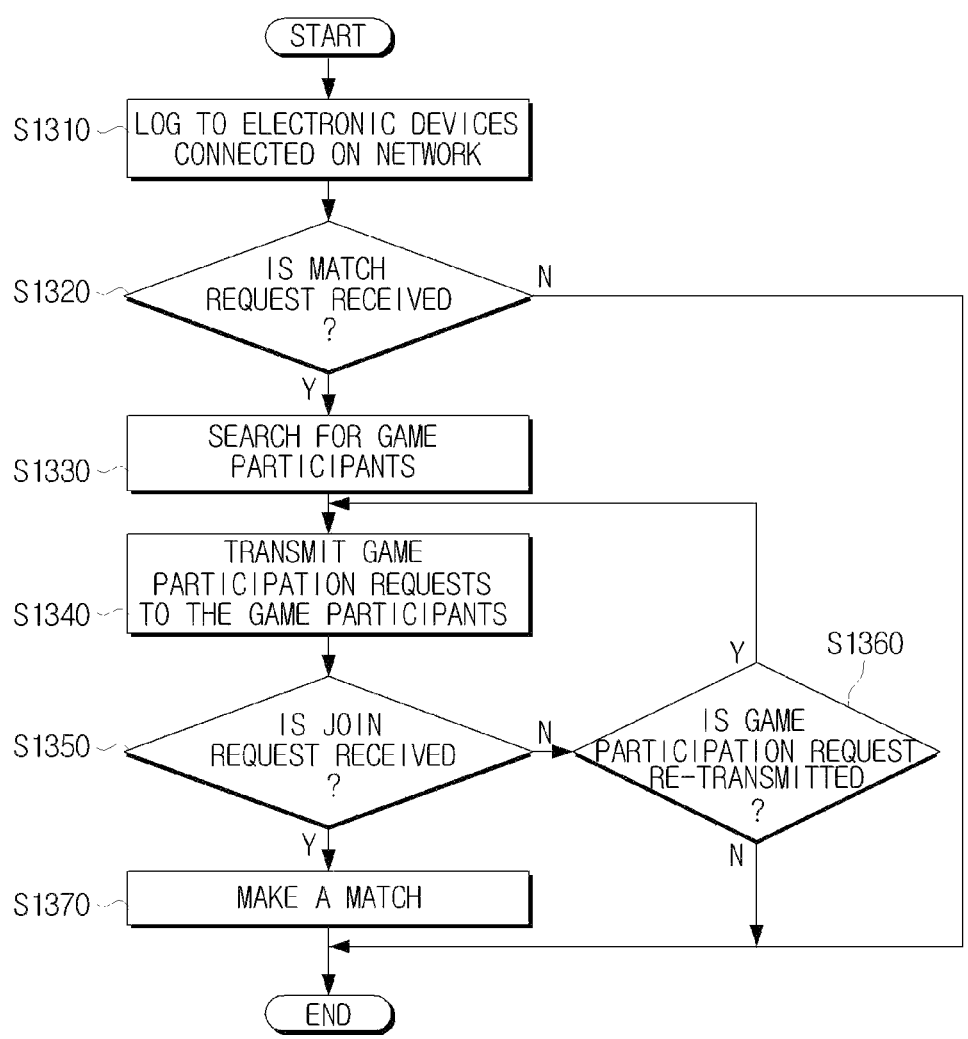
FIG. 13 is a flowchart explaining a method of matching game users in a server according to an embodiment of the present invention.

FIG. 13 is a flowchart explaining a method of matching game users in a server, according to an embodiment of the present invention. Referring to FIG. 13, if unique information is received from each of the electronic devices, the server receives authorization for each of the electronic devices from a specific Internet site so that login is performed in operation S1310.

If a match request is received in operation S1320-Y, the server searches for game participants in operation S1330. In more detail, the server may select appropriate game participants by taking into consideration the user who requested the game from among users of electronic devices that have already logged onto the server. In this situation, selection criteria may be based on the network speed of electronic devices or a gaming ranking, or may be selected randomly. That is, the server may transmit game participation requests only to electronic devices satisfying predetermined conditions for each criterion. For example, if network speed is used as a selection criterion, the server may prefer electronic devices having a network speed higher than the speed offered by an electronic device used by the user who requests the game. Additionally, if the gaming ranking (for example, a percentage of victories) is used as a selection criterion, a difference in the game ranking between the electronic device used by the user who requests the game and the other electronic devices found by the server may be within a predetermined range. Furthermore, if the total number of matches is used as a selection criterion, only users who have played the game a number of times equal to or greater than a predetermined number may be found by the server as game participants.

Accordingly, if game participants have been found as a result of the search (operation S1330), the server transmits game participation requests to the game participants in operation S1340. Electronic devices used by the game participants to which the game participation requests are transmitted may display a message asking whether to participate in the game. If a game participant selects "Yes" in response to the message, a join request is transmitted to the server.

If the join requests are received from the game participants in operation S1350-Y, a match is made with the respective game participants who transmit the join requests in operation S1370. Conversely, if no join request is received from the game participants for a predetermined period of time (operation S1350-N), the server selects other electronic devices and re-transmits the game participation requests to the selected electronic devices in operations S1360 and S1340. Accordingly, the server may transmit the game participation requests sequentially to the electronic devices that have logged onto the server, and may ask the users of the electronic devices whether they wish to join the game.

Although not illustrated in FIG. 13, if the network quick join option is selected, the server may generate a match room and display room information on a game lobby, so that users may spontaneously participate in a game. As described above, the search operation may be actively performed together with spontaneous participation, so it is possible to more rapidly search for game participants. Furthermore, if a large number of electronic devices are connected via a network or subnet and if match requests are frequently received, the server may instantly make a match without the need to search for game participants.

Figure 14:
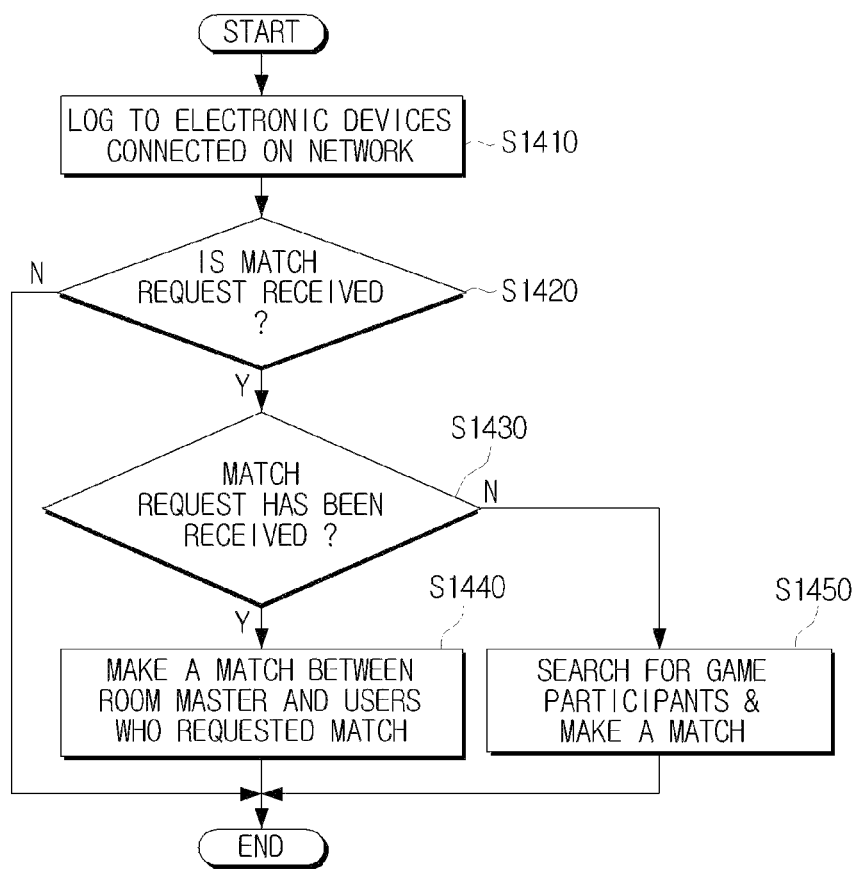
FIG. 14 is a flowchart explaining a method of matching game users according to another embodiment of the present invention.

FIG. 14 is a flowchart explaining a method of matching game users, according to another embodiment of the present invention. Referring to FIG. 14, when an electronic device connected to a network logs onto a server in operation S1410 and a match request is received in operation S1420-Y, the electronic device checks whether another match request has been received in operation S1430. In other words, the electronic device checks whether there is a match room in which a match has not yet been made among match rooms that have been generated. For example, the electronic device may determine whether another match request has been received within a predetermined period of time (for example, two minutes) prior to receiving the current match request.

If it is determined that there is a match room that has not been filled with game participants or that another match request has been received, the server may create a match between a room master who generates the match room and users who requested a match in operation S1440, without additionally searching for game participants. Here, the search operation may include operations from the initial operation to selecting game participants to which the server may transmit game participation requests, or to transmitting game participation requests and receiving join requests.

Alternatively, if it is determined that no match request has been received in operation S1430-N, the server searches for game participants and allows a match to be made in operation S1450. In this situation, the process shown in FIG. 13 may be performed.

While the method of matching game users using the server has been described with reference to FIG. 14, electronic devices on a subnet may also create a match instantly without the need to additionally search for game participants. In more detail, if a user requests a match and a match request has been received from another electronic device, a match may be made between an electronic device used by the user and the other electronic device. Illustration of this situation is omitted.

Figure 15:
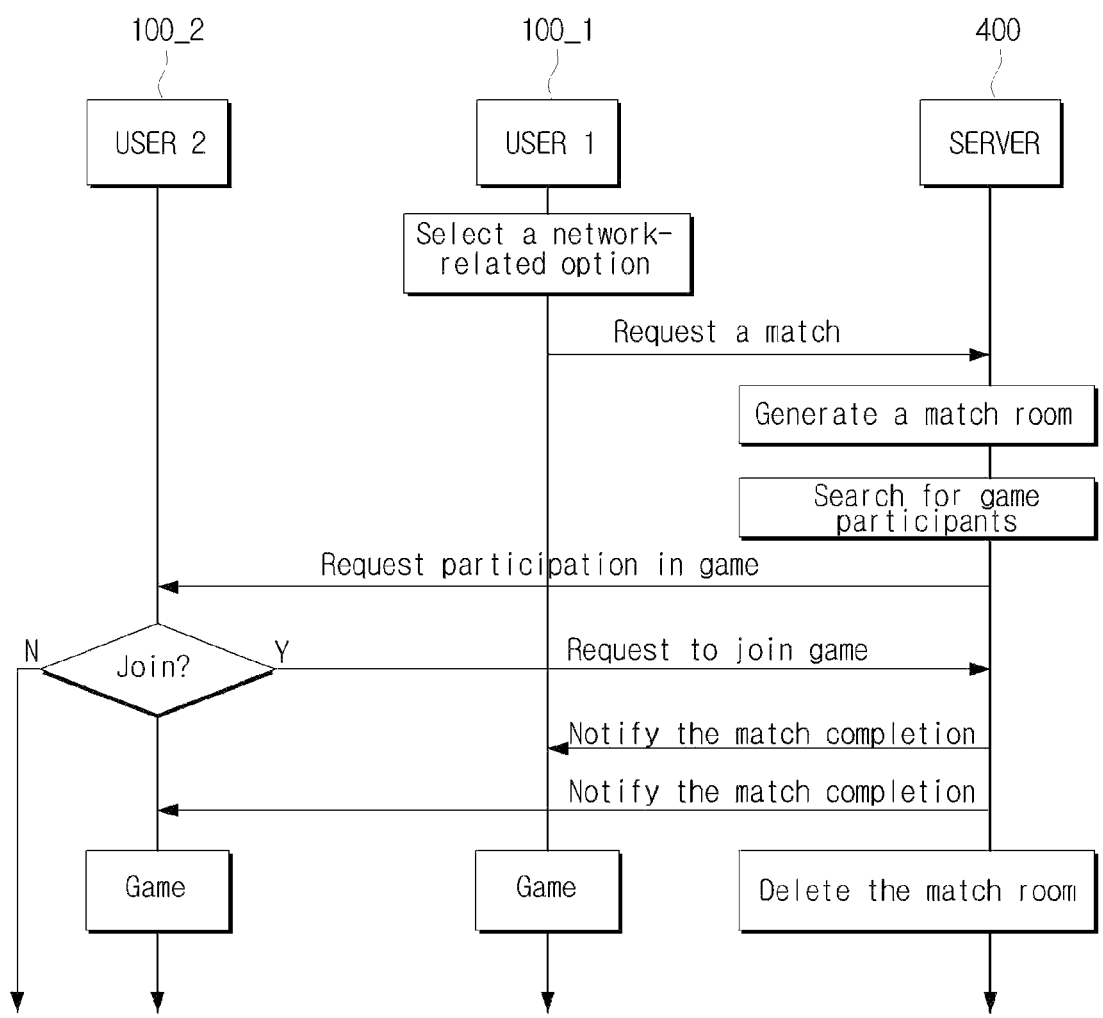
FIG. 15 is a flowchart explaining a process of matching game users on a network according to an embodiment of the present invention.

FIG. 15 is a flowchart explaining a process of matching game users on a network according to an embodiment of the present invention. Referring to FIG. 15, a network-related option is selected on an electronic device 100_1 used by a first user (hereinafter, referred to as USER 1), and a match request is transmitted to a server 400.

The server 400 generates a match room, searches for another game participant and transmits a game participation request to the game participant found as a result of the search. If the game participation request is received by an electronic device 100_2 used by a second user (hereinafter, referred to as USER 2) from the server 400, USER 2 displays a message asking whether to participate in a game on a screen, so the second user may decide whether to accept the game participation request. If USER 2 decides to join the game, a join request is transmitted to the server 400. The server 400 then transmits match completion notifications to USER 1 and USER 2.

In response to the match completion notifications, if both USER 1 and USER 2 confirm (for example, by selecting "Ready to play the game" or "Start"), a match is made and the game is started. In response to the game being launched, the server 400 deletes a corresponding match room.

Figure 16:
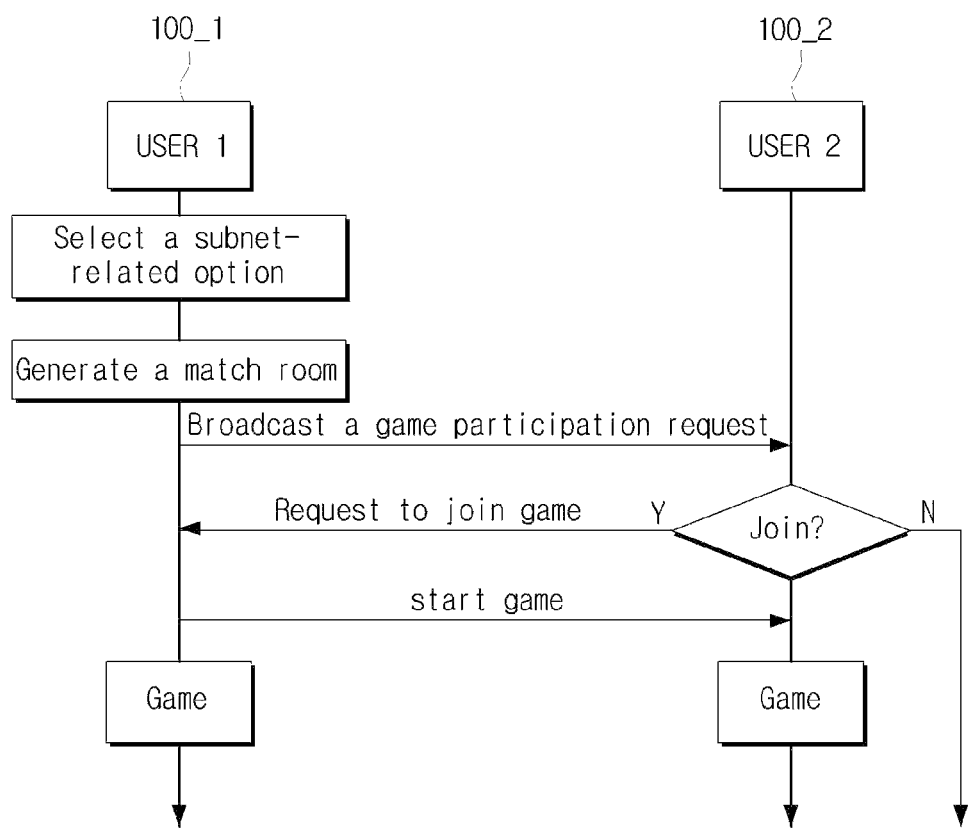
FIG. 16 is a flowchart explaining a process of matching game users on a subnet according to an embodiment of the present invention.

FIG. 16 is a flowchart explaining a process of matching game users on a subnet according to an embodiment of the present invention. Referring to FIG. 16, USER 1 and USER 2 are connected via the subnet, such that both USER 1 and USER 2 act as servers and a separate server is not required. If a subnet-related option is selected, USER 1 generates a match room and broadcasts a game participation request to USER 2 connected to the subnet.

In response to the game participation request, USER 2 displays a message asking whether the user wishes to join the game, and the second user decides whether to accept the game participation request. If USER 2 decides to join the game, a join request is transmitted to USER 1. After receiving the join request, if USER 1 confirms (for example, by selecting "Start"), a game start notification is transmitted to USER 2, and the game is started.

Figure 17:
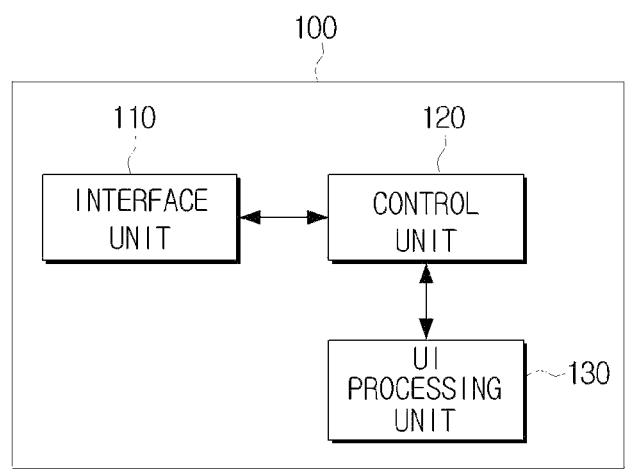
FIG. 17 is a block diagram showing an electronic device according to an embodiment of the present invention.

FIG. 17 is a block diagram showing an electronic device 100 according to an embodiment of the present invention. Referring to FIG. 17, the electronic device 100 includes an interface unit 110, a control unit 120, and a user interface (UI) processing unit 130.

The interface unit 110 relays communication between the electronic device 100 and a server on a network, and/or communication between the electronic device 100 and other electronic devices on a subnet. The UI processing unit 130 generates a user interface screen through which a user is able to select options to start a game, and displays the generated user interface screen. If the user selects an option to match a plurality of users to play a game using the user interface screen, the control unit 120 searches the network or subnet for game participants via the interface unit 110 and creates a match.

Specifically, the UI processing unit 130 may display user interface screens as shown in FIGS. 2 and 3. If the user selects either the network quick join option or network quick match option shown in FIG. 3, the control unit 120 transmits a match request to the server on the network, so that the server transmits game participation requests to other electronic devices logged onto the server. Alternatively, if the user selects either the subnet quick join option or subnet quick match option shown in FIG. 3, the control unit 120 directly transmits game participation requests to other electronic devices on the subnet itself.

The other electronic devices that have received the game participation requests from the server or from the electronic device 100 may respectively display messages to ask users of the electronic devices whether to join the game. Accordingly, if a user decides to join the game on viewing the displayed message, a join request may be sent to the control unit 120.

The control unit 120 allows a match to be created in response to the join requests from the server or from other electronic devices. In this situation, if the join option is selected, the control unit 120 may wait for a plurality of game participants to join the game. Alternatively, if the match option is selected, the control unit 120 may create a match as soon as a join request is received from a single game participant.

If a match request has been received via the network or the subnet during a predetermined period of time prior to a selection of an option on the user interface screen, the control unit 120 may instantly make a match with the game participant who has transmitted the match request, without transmitting game participation requests to other electronic devices. Additionally, if the electronic device 100 is turned on, the control unit 120 may transmit unique information pertaining to the electronic device 100 (such as a UDN) to the server, so that automatic login is performed. This operation may be performed in an initial process after the electronic device 100 has been turned on. Accordingly, if another user requests a match, the control unit 120 may rapidly transmit the match request to the server so that the user can decide whether to join a game.

A message asking whether to join a game may be displayed in the form shown in FIGS. 5 and 6. Additionally, a plurality of IDs may be registered using a single UDN, so the UI processing unit 130 may provide a list from which one ID may be selected from among the plurality of registered IDs.

The UI processing unit 130 may generate and display a mode setting screen through which a user is able to decide whether to accept receipt of a game participation request from the server on the network or from another electronic device on the subnet. The mode setting screen may be configured in the form shown in FIG. 10. Accordingly, the game participation request may only be received when the user decides to accept receipt of the game participation request through the mode setting screen, and so a message requesting confirmation on whether to join a game may be displayed.

If the user decides to join the game by responding to the displayed message, the control unit 120 may transmit a join request to the server or the other electronic device. Accordingly, a match may be created with the electronic device 100 that transmits the game participation requests.

As described above, according to aspects of the present invention, it is possible to collect game participants more rapidly and create a match therebetween, when a user desires to start a game using an electronic device. Therefore, it is also possible to enable a game operation of the electronic device to be utilized more fully.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of matching game in an electronic device, the method comprising:
displaying a main menu to receive, from a user, a selection of a player option for the game, where the main menu includes a single player option and a multiplayer option;
displaying a sub menu to select a network option in accordance with the received selection of the player option;
transmitting a match request to a server for creating a match corresponding to the network option and the player option, or a join request to the server for joining a created match; and performing the game, when there is a creation of game matching with at least one electronic device.

2. The method as claimed in claim 1, wherein the single player option comprises a quick match option to game with one electronic device, and the multiplayer option comprises a quick join option to game with at least two electronic devices.

3. The method as claimed in claim 1, wherein the network option includes a network for gaming with at least one electronic device through the server and a subnet for gaming with at least one electronic device without the server.

4. The method as claimed in claim 1, further comprising:
transmitting unique information of the electronic device to a server on the network, so that automatic login is performed, in response to a turning on of the electronic device.

5. The method as claimed in claim 4, further comprising:
if a plurality of identifications (IDs) are registered in the server for the unique information of the electronic device, providing a list to enable the user to select one from among the plurality of registered IDs.

6. The method as claimed in claim 3, further comprising:
displaying a mode setting screen to receive a setting from the user to allow or to deny receipt of a game participation request from a server on the network or another electronic device on the subnet;
if the setting input by the user allows receipt of the game participation request and the game participation request is received, displaying a message requesting confirmation on whether to join a game; and
joining the game by transmitting a join request in response to a receiving of the confirmation from the electronic device.

7. A method of matching game in a server, the method comprising:
receiving a plurality of unique information respectively from a plurality of electronic devices to log onto the server and logging the plurality of electronic devices onto the server based on the received unique information;
receiving a match request from at least one of the plurality of electronic devices logged onto the server;
in response to the match request received from the at least one of the plurality of electronic devices logged onto the server, transmitting a game participation request to at least another one of the plurality of electronic devices logged onto the server;
receiving a join request from the at least other one of the plurality of electronic devices logged onto the server in response to the game participation request;
creating a match between the at least one of the plurality of electronic devices that has transmitted the join request and the at least one of the plurality of electronic devices that has transmitted the match request; and
transmitting information on the matched game,
wherein the match request includes information on a network option and a player option.

8. The method as claimed in claim 7, further comprising searching for the at least one electronic device satisfying predetermined conditions based on a network speed, a game ranking, and/or a total number of matches played from among the plurality of logged on electronic devices.

9. The method as claimed in claim 7, wherein the transmitting of the game participation request comprises:
broadcasting the at least one game participation request to a predetermined number of electronic devices among a plurality of electronic devices searched; and
if no join request is received in response to the at least one game participation request within a predetermined period of time, repeatedly broadcasting the at least one game participation request to other electronic devices until the join request is received.

10. The method as claimed in claim 7, further comprising:
if one or more match requests are received from a plurality of electronic devices within a predetermined period of time, creating the match between the plurality of electronic devices without searching for the at least one electronic device.

11. The method as claimed in claim 10, further comprising:
if one or more match requests are received from a plurality of electronic devices, creating the match between a room master that generates a match room in which a match has not yet been created among match rooms that have been generated, and users of the plurality of electronic devices that have transmitted the one or more match requests.

12. An electronic device to play a game and to match game between electronic devices, the electronic device comprising:
an interface unit to transmit a match request to a server or other electronic device for creating a match, or to transmit a join request to a server or other electronic device for joining a created match;
a display unit to display a main menu to receive, from a user, a selection of a player option for the game, where the main menu includes a single player option and a multiplayer option, and to display a sub menu to select a network option in accordance with the received selection of the player option;
a user interface (UI) processing unit to generate a user interface screen on the display unit to receive, from a user, a selection of an option for the game; and
a control unit to search the network or the subnet for one or more game participants and create the match, if the electronic device is a host device, and otherwise, to join the created match.

13. The electronic device as claimed in claim 12, wherein the single player option comprises a quick match option to game with one electronic device, and the multiplayer option comprises a join option to game with at least two electronic devices.

14. The electronic device as claimed in claim 12, wherein the network option includes a network option includes a network for gaming with at least one electronic device trough the server and a subnet for gaming with at least one electronic device without the server.

15. The electronic device as claimed in claim 12, wherein the control unit creates a match with an electronic device that has transmitted the join request, without searching the subnet for one or more electronic devices, when the electronic device is a host device.

16. The electronic device as claimed in claim 12, wherein the control unit transmits, via the interface unit, unique information of the electronic device to the server on the network, so that automatic login is performed, in response to a turning on of the electronic device.

17. The electronic device as claimed in claim 16, wherein, if a plurality of identifications (IDs) are registered in the server for the unique information of the electronic device, the UI processing unit displays a list to enable the user to select one from among the plurality of registered IDs.

18. The electronic device as claimed in claim 12, wherein:
the UI processing unit displays a mode setting screen to receive a setting from the user to allow or to deny receipt of a game participation request from the server on the network or another electronic device on the subnet;
the UI processing unit displays a message requesting confirmation on whether to join a game if the setting received from the user allows receipt of the game participation request and the game participation request is received; and if the confirmation is received from the user, the control unit transmits a join request to the server on the network or the other electronic device that transmitted the game participation request.

19. The method as claimed in claim 1, wherein the match request or the join request is transmitted to the other electronic device when a subnet is selected as the network option.

20. The method as claimed in claim 19, further comprising:
creating a match to game with the electronic device that has transmitted a join request, when a subnet is selected as the network option.

21. A method to match game between electronic devices, the method comprising:
displaying a main menu to receive a selection of a player option for the game, where the main menu includes a single player option and a multiplayer option;
displaying a sub menu to select a network option in accordance with the received selection of the player option;
transmitting a match request to a server for creating a match corresponding to the network option and the player option;
creating a match based on the player option and the network option;
transmitting a game participation request to at least one of electronic devices logged onto the server; and
transmitting a join request to a server for joining the created match.

* * * * *